United States Patent [19]

Krsul et al.

[11] Patent Number: 5,839,119
[45] Date of Patent: Nov. 17, 1998

[54] METHOD OF ELECTRONIC PAYMENTS THAT PREVENTS DOUBLE-SPENDING

[75] Inventors: Ivan V. Krsul, W. Lafayette, Ind.; J. Craig Mudge, Palo Alto; Alan J. Demers, Boulder Creek, both of Calif.

[73] Assignee: Xerox Corporation, Stamford, Conn.

[21] Appl. No.: 721,484

[22] Filed: Sep. 27, 1996

[51] Int. Cl.$^6$ .............................. G06F 17/60; H04R 9/00
[52] U.S. Cl. ................................ 705/39; 705/26; 705/35; 705/40; 705/41; 308/4; 308/24
[58] Field of Search ................................ 705/26, 39, 40, 705/41; 308/4, 24

[56] References Cited

U.S. PATENT DOCUMENTS

| | | | |
|---|---|---|---|
| Re. 32,985 | 7/1989 | Nagata et al. | 705/41 |
| 4,277,837 | 7/1981 | Stuckert | 705/41 |
| 4,341,951 | 7/1982 | Benton | 705/41 |
| 4,450,535 | 5/1984 | De Pommery et al. | 705/41 |
| 4,529,870 | 7/1985 | Chaum | 235/380 |
| 4,766,293 | 8/1988 | Boston | 705/41 |
| 4,799,156 | 1/1989 | Shavit et al. | 705/26 |
| 4,877,947 | 10/1989 | Mori | 705/41 |
| 4,914,698 | 4/1990 | Chaum | 380/30 |
| 4,926,480 | 5/1990 | Chaum | 380/23 |
| 5,140,517 | 8/1992 | Nagata et al. | 705/41 |
| 5,224,162 | 6/1993 | Okamoto et al. | 380/24 |
| 5,305,383 | 4/1994 | Guillou et al. | 380/24 |
| 5,511,121 | 4/1996 | Yacobi | 380/24 |
| 5,557,516 | 9/1996 | Hogan | 705/41 |
| 5,590,038 | 12/1996 | Pitroda | 705/41 |
| 5,691,524 | 11/1997 | Josephson | 705/40 |
| 5,692,132 | 11/1997 | Hogan | 705/27 |
| 5,704,046 | 12/1997 | Hogan | 705/39 |
| 5,745,886 | 4/1998 | Rosen | 705/39 |
| 5,754,656 | 5/1998 | Nishioka et al. | 380/25 |
| 5,757,917 | 5/1998 | Rose et al. | 380/25 |

OTHER PUBLICATIONS

Chaum, D., "Achieving Electronic Privacy." *Scientific American*, Aug. 1992, pp. 96–101.

Chaum, D., "Achieving Electronic Privacy." *Scientific American*, Aug. 1992, pp. 96–101. Copyright (c) 1992 by Scientific American, Inc. Found on the WWW at http://ganges.cs.tcd.ie/mepeirce/Project/Chaum/sciam.html.

Chaum, D., "Prepaid Smart Card Techniques: A Brief Introduction and Comparison." Copyright (c) 1994 by DigiCash bv. Found on the WWW at http://ganges.cs.tcd.ie/mepeirce/Project/Chaum/cardcom.html.

Chaum, D., "Security without Identification: Transaction Systems to Make Big Brother Obsolete." *Communications of the ACM*, vol. 28, No. 10, Oct. 1985, pp. 1030–1044.

(List continued on next page.)

*Primary Examiner*—Allen R. MacDonald
*Assistant Examiner*—James W. Myhre

[57] ABSTRACT

A method of generating electronic monetary tokens that supports off-line transactions while preventing double-spending. Generation of electronic token halves by a financial services provider begins in response to a request from a buyer to generate electronic monetary tokens to be used with an identified seller. First, the financial services provider generates a multiplicity of electronic monetary tokens. Second, the provider splits each electronic monetary token into two electronic token halves and associates with each the same serial number. These electronic token halves when combined recreate the electronic monetary token from which they were generated, but by themselves neither electronic token half has any value. Nor can either electronic half by itself be used to create the electronic monetary token without the token half's mate. After splitting all of the electronic monetary tokens, the services provider assigns a half of each electronic token the seller and the other half of each electronic token to the buyer. The buyer and seller can now engage in multiple transactions off-line of the financial services provider.

24 Claims, 10 Drawing Sheets

OTHER PUBLICATIONS

Low, S.H. and S. Paul. "Anonymous Credit Cards." *2nd ACM Conference on Computer and Communications Security*, IEEE, Nov. 2–4, 1994, Fairfax, Virginia, pp. 108–117.

Manasse, M.S., "The Millicent Protocols for Electronic Commerce." *First USENIX Workshop on Electronic Commerce*, Jul. 11–12, 1995, pp. 117–123.

Okamoto, T.and K. Ohta. "Disposable Zero–Knowledge Authentications and Their Applications to Untraceable Electronic Cash." *CRYPTO '89*, Santa Barbara, California, Aug. 20–24, 1989, pp. 481–496.

Okamoto, T.and K. Ohta. "Universal Electronic Cash." *Advances in Cryptology—CRYPTO '91 Proceedings*, Berlin: Springer–Verlag, 1992, pp. 324–337.

Singleton, A. "Cash on the Wirehead." *BYTE*, Jun. 1995, pp. 71–78.

"Buying data bit by bit with microcash; New Technology lets Internet users pay as they go", PC Week, ISSN: 0740–1604, pp. NO3, Aug. 26, 1996.

"Q&A: MIT Guru Sees Future in Digital Cash", American Banker, ISSN: 0002–7561, p. 10, Feb. 28, 1997.

"Can Digital Change Balance of E–Commerce?", PC Week, ISSN: 0740–1604, p. 27, Mar. 2, 1998.

Dr. Andreas Schoter and Rachel Willmer, "Inter://trader, Digital Money Only, A Review of Some Existing Technologies", Intertrader Ltd, http.//www.intertrader.com/library/digitalmoneyonline/dmo/dmo.htm, Feb. 1997.

"Electronic Cash, Tokens and Payments in the National Information Infrastructure", http://ganges.cs.ted.ie/mepeirce/Project/Pro/ToC.html, May 29, 1998.

METHOD OF ELECTRONIC PAYMENTS THAT PREVENTS DOUBLE-SPENDING

FIELD OF THE INVENTION

The present invention relates to a method of electronic payments. In particular, the present invention relates to a method that permits electronic payments to occur off-line while still preventing double spending.

BACKGROUND OF THE INVENTION

David Chaum proposed one of the earliest digital cash models in 1985. Chaum's efforts were followed by others, including Okamoto and Ohta. According to Okamoto and Ohta, an ideal digital cash system possesses six properties:

1. Independence—The security of ideal digital cash does not depend upon physical location.
2. Security—Ideal digital cash cannot be copied and used again; in other words, double spending can be prevented.
3. Off-line payment. A buyer can buy goods and services from a seller off-line of a financial services provider.
4. Transferability. Ideal digital cash can be transferred to others.
5. Divisibility. A piece of digital cash in a given amount can be broken into smaller pieces of lesser value.
6. Privacy. The privacy of users is protected so that no one can trace the relationship between a buyer and her purchases.

Okamoto and Ohta proposed a protocol that provided all six properties in their paper Universal Cash, Advances in Cryptology—CRYPTO '91 Proceedings, Berlin: Springer-Verlag, 1992, pp. 324–337. According to their protocol the data requirement for a single purchase is several megabytes. Additionally, the protocol requires substantial computation per transaction. Other digital cash systems fail to provide off-line transactions, requiring that at least one other party, besides the buyer and seller, be on-line. Still other digital cash systems permit off-line transactions, but fail to provide security because they can only detect double-spending after it has occurred.

For obvious reasons digital cash systems particularly interest businesses operating on the Internet and World Wide Web. These businesses include many relatively new types of businesses, such as on-line newspapers, print on demand services, digital libraries, and database services, like Nexus/Lexis™ and Dialog™. Additionally, some observers anticipate that new document services will be provided via the World Wide Web, including file conversion and document summarization. The cost per transaction for all of these goods and services is likely to be very slight, tenths of a cent to a few cents. For this reason such transactions are called microtransactions. The size of microtransactions makes them very sensitive to transaction overhead, both in terms of data requirement and computational cost. Accordingly, a need exists for a system of electronic payments that permits electronic payments to occur off-line of a financial services provider, provides security and low transaction overhead for both buyers and sellers, while still providing buyer anonymity.

SUMMARY OF THE INVENTION

An object of the present invention is to support microtransactions.

Another object of the present invention is to allow purchases to occur off-line of a financial services provider.

Another object of the present invention is to prevent double spending of electronic monetary tokens.

Yet another object of the present invention is to provide a method of electronic payment that reduces the computational cost and data requirement per microtransaction.

A still further object of the present invention is to provide limited anonymity to users of electronic monetary tokens.

These and other objects are satisfied by the method of the present invention for generating electronic token halves that can be combined to create a electronic monetary token that will be honored by a financial services provider. Using these electronic token halves, the buyer and seller may engage in transactions off-line of the financial services provider, while still providing security against double spending. These electronic token halves are well suited to use in microtransactions because of their small data requirement and limited computational cost per microtransaction.

According to the present method generation of electronic token halves by a financial services provider begins in response to a request from a buyer to generate electronic monetary tokens to be used with an identified seller. First, the financial services provider generates a multiplicity of electronic monetary tokens. Second, the provider splits each electronic monetary token into two electronic token halves and associates with each the same serial number. These electronic token halves when combined recreate the electronic monetary token from which they were generated, but by themselves neither has any value. Nor can either electronic half by itself be used to create the electronic monetary token without the token half's mate. After splitting all of the electronic monetary tokens, the financial services provider assigns a half of each electronic monetary token to the seller and the other half of each electronic monetary token to the buyer. Upon receipt of their electronic token halves the buyer and seller can engage in multiple transactions off-line of the financial services provider. Because each electronic token half cannot be used by itself to recreate the electronic monetary token it partially represents, the buyer can transmit electronic token halves without first encrypting them. Thus, there is little computational cost per microtransaction to the buyer. Additionally the data requirement per microtransaction is also small, because the electronic token half can be represented in as few as approximately 20–500 bytes. Upon receipt of an electronic token half, the seller can protect himself from double spending attempts using the session serial number associated with the reconstructed electronic monetary token. The computational cost to the seller per microtransaction is also small.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

Figure 1:
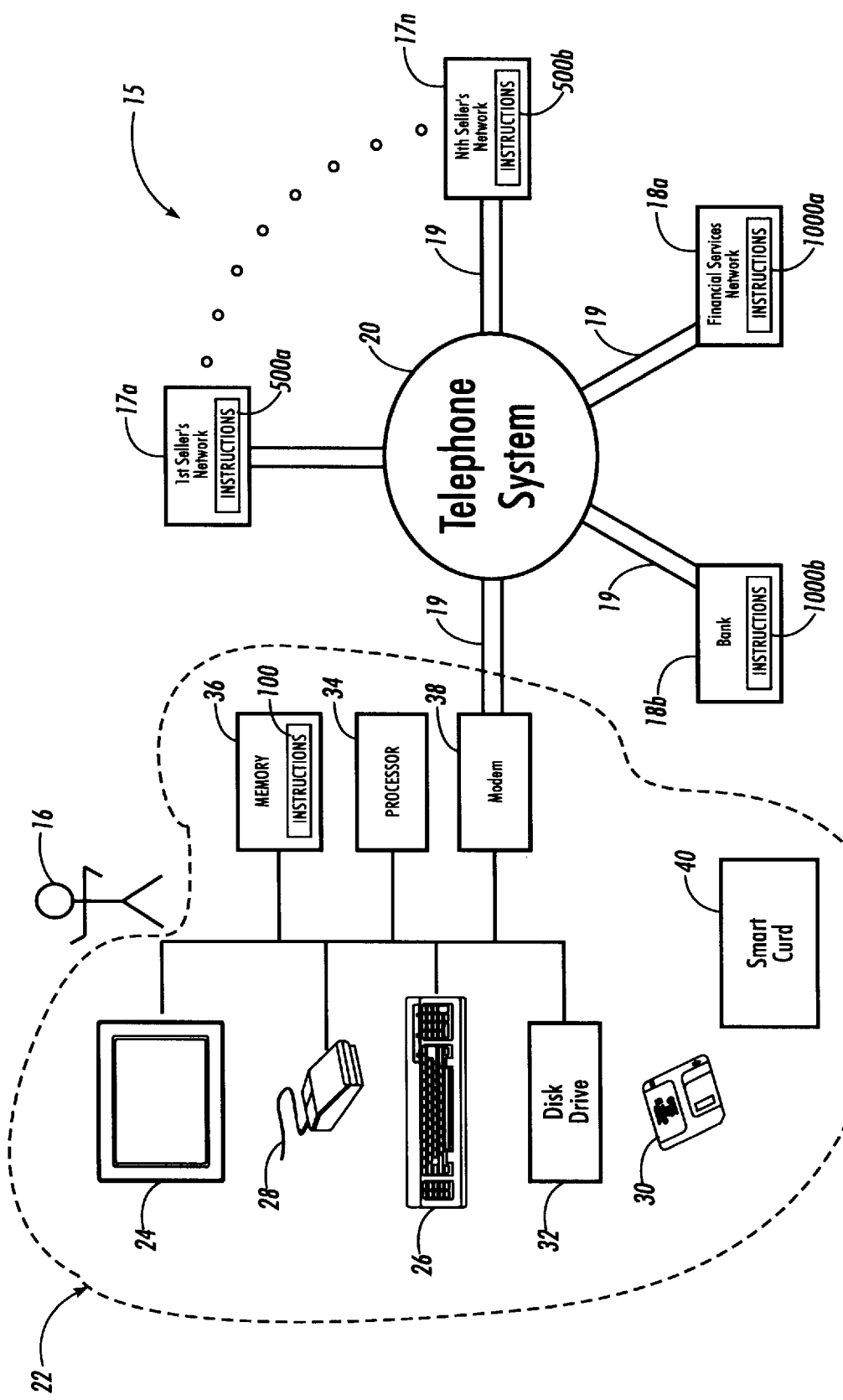
FIG. 1 illustrates a communications system in which the present method operates.
Figure 4A:
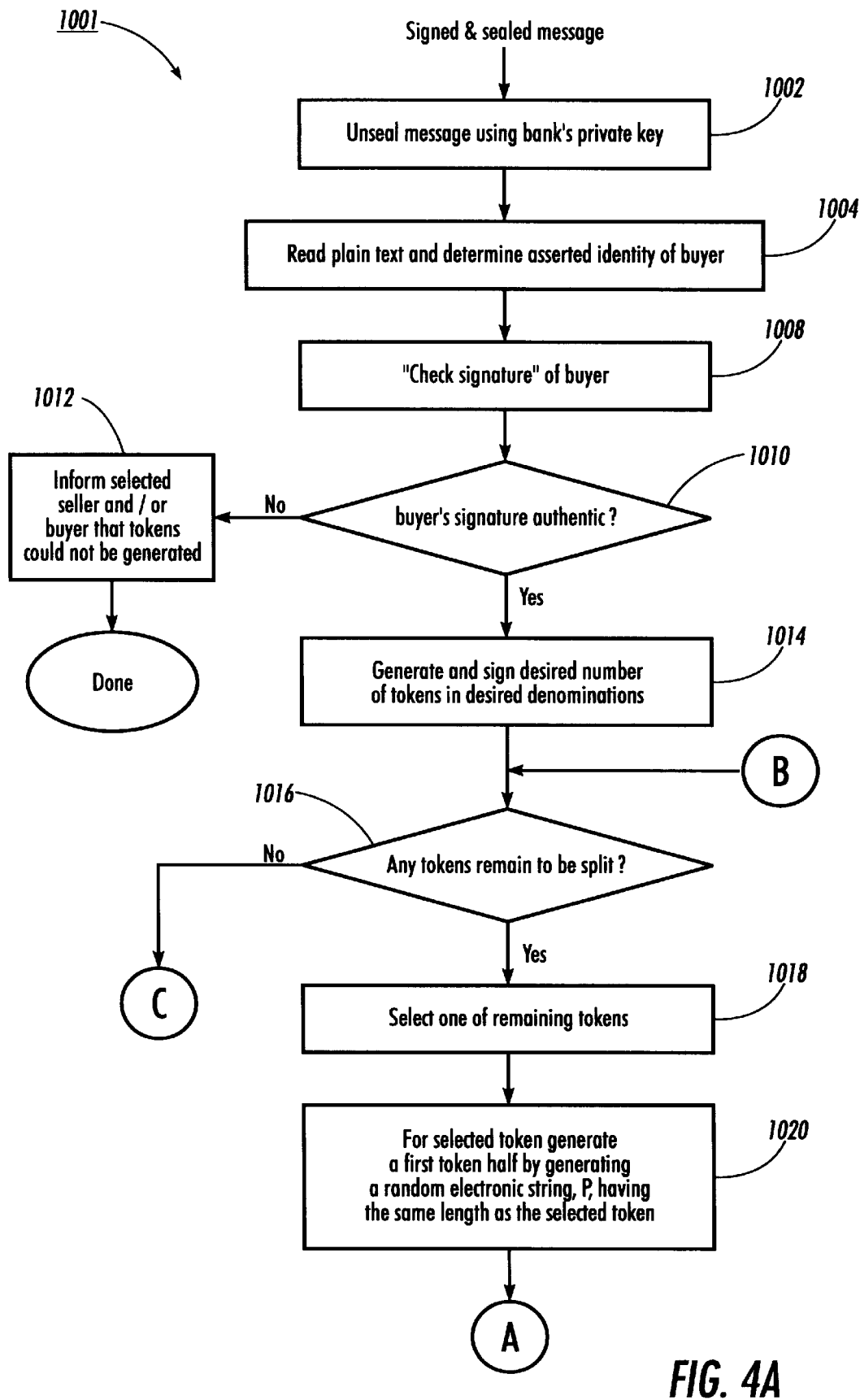
FIGS. 4A and 4B illustrate a method of generating and splitting electronic tokens.
Figure 4B:
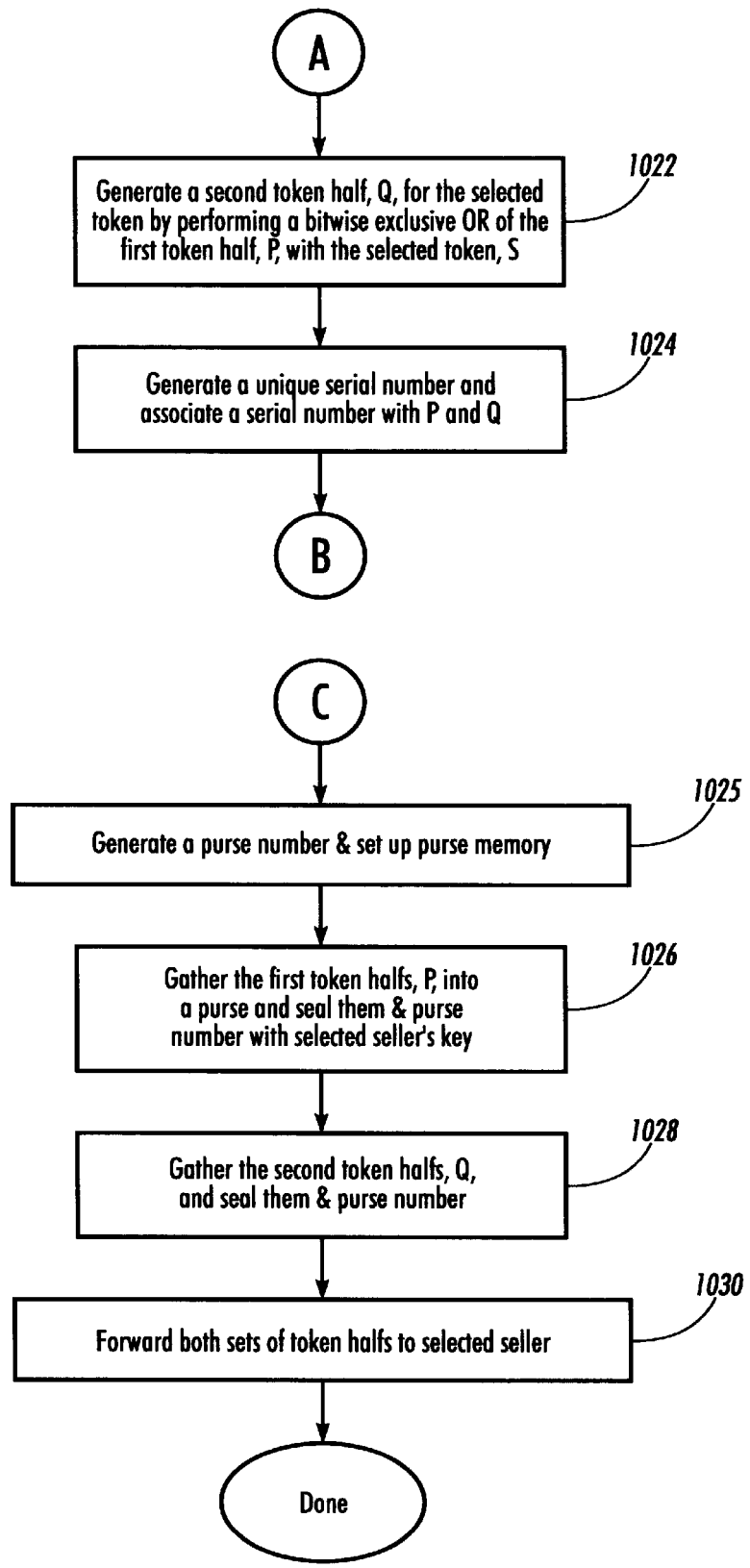

FIG. 1 illustrates in block diagram form communications system 15 in which the present method is implemented by executing instructions 100, 500, and 1000. Instructions 100, 500, and 1000 alter the operation of communications system 15, allowing buyers and sellers within the system to engage in many electronic microtransactions off-line of a financial services provider, while still preventing double-spending. In particular, as illustrated in FIGS. 4A and 4B, instructions 1000 enable a financial services provider to generate electronic monetary tokens that can be spent off-line of the provider, while still preventing double-spending. Briefly described, a financial services provider generates a number of electronic monetary tokens, divides each of these in half and assigns a serial number to each pair of electronic token halves. The financial services provider then gathers the electronic token halves into two electronic purses and gives one purse to a seller and the other to a buyer. This is analogous to printing a dollar bill, cutting the bill in half and giving one half to the buyer and the other to the seller. The buyer may then make a number of off-line purchases from the seller. For each transaction the buyer presents an electronic token half. The seller can detect double-spending attempts by the buyer off-line of the financial services provider using the serial number of the proffered electronic token half.

A. A Communications System for Off-line Microtransactions

Prior to a more detailed discussion of the present method, consider FIG. 1. Communications system 15 couples together, via telephone lines 19 and telephone system 20, buyers 16, sellers 17, and financial service providers 18 or banks. For the sake of brevity in the following discussion, the term "bank" will be used to refer to both banks and financial services providers. Communications system 15 enables both communication between buyers 16, seller 17 and banks 18, as well as microtransactions between buyers 16 and sellers 17 off-line of financial services providers 18.

A buyer-seller pair complete an off-line microtransaction by combining two halves of an electronic token. As used herein, an "electronic token" is a group of electrically represented bits, which can be electronically transmitted and stored, that has some agreed upon monetary value that will be honored by a financial services provider 18. Preferably, to support microtransactions the value represented by each electronic token is small, such as, for example, 0.01¢, 1¢, 25¢, $1, or $2. (Note that the present invention is not limited to a particular monetary unit.) Each electronic token should include a unique serial number. As used herein, an "electronic token half" is a group of electronically represented bits, which can be electronically transmitted and stored, that when combined with a corresponding electronic half token results in an electronic token. By itself, an electronic half token has no value; further, each electronic half token can only be combined with a single, corresponding electronic half token.

Any person or entity purchasing goods or service via communications system 15 using electronic token halves is a buyer 16. Each buyer may communicate with sellers via smart card 40 alone, or use smart card 40 in combination with computing device 22. Smart card 40 enables buyer 16 to communicate with sellers 17 and financial service providers 18 by storing electronic token halves and, preferably, the buyer's private key. During microtransaction initiation, which will described below, smart card 40 may be inserted into a seller's smart card scanning device, or the buyer's computing device 22, to electronically sign, seal and unseal documents as necessary, as well as to receive and store electronic tokens. Buyer 16 may use smart card 40 to pay for microtransactions by using smart card 40 by inserting it into a payment device provided by a seller 17, such as for example, a parking meter or a telephone booth. Alternatively, buyer 16 could pay seller 17 for goods delivered via the Internet by inserting smart card 40 into computing device 22. To provide this functionality, smart card 40 is small and portable, preferably about the size of a credit card, to allow it to be easily transported in a purse or pocket. Smart card 40 includes a processor and solid state memory, not illustrated. One device that might be used to realize smart card 40 is the iPower PCMCIA(1) card produced by National Semiconductor Corporation of Santa Clara, Calif. Alternatively, flash memory cards may be used to implement a smart card 40 just for storing electronic tokens.

Each buyer 16 may use smart card 40 in combination with computing device 22. Computing device 22 connects buyer 16 to seller 17 and financial services provider 18 via telephone system 22. Typically, computing device 22 includes monitor 24 for visually displaying information to buyer 16. Computing device 22 also provides buyer 16 multiple avenues to input data including keyboard 26 and mouse 28. Alternately, buyer 16 can input data stored on a magnetic medium, such as a floppy disk 30, by inserting the disk into floppy disk drive 32. Processor 34 controls and coordinates the operations of computing device 22. Processor 34 determines and takes the appropriate action in response to each user command by executing instructions 100 stored electronically in memory, either memory 36 or on a floppy disk 30 within disk drive 32. Typically, operating instructions for processor 34 are stored in solid state memory, allowing frequent and rapid access to the instructions. Additionally, memory 36 stores instructions 100 to enable processor 34 to initiate and complete microtransactions in conjunction with smart card 40. Instructions 100 may be written in any computer language, including, but not limited to, C++, Python, or Lisp. Semiconductor logic devices that can be used to realize memory 36 include read only memories (ROM), random access memories (RAM), dynamic random access memories (DRAM), programmable read only memories (PROM), erasable programmable read only memories (EPROM), and electrically erasable programmable read only memories (EEPROM), such as flash memories.

To communicate with sellers 17 and financial service providers 18, computing device 22 includes a modulator/demodulator (modem) 38 coupled to telephone line 19. Modem 38 allows computing device 22 to transmit and receive electronic information via telephone line 19.

Alternately, buyers 16 might communicate with communications system 15 using a less powerful device known as an "internet appliance." Internet appliances have been proposed by companies like Intel, Oracle, and Microsoft foresee interest in a simple box, without a monitor, including little memory or resident software, that would allow consumers to connect to the internet using their televisions. Buyers 16 would be able to use an internet appliance to engage in purchases over the World Wide Web provided that the appliance accommodated smart card 40.

Each seller 17 uses at least one computing device, similar to computing device 22, to communicate with telephone system 20 via telephone lines 19. Consequently, the computing devices used by sellers 17 will not be described in detail herein. Large sellers may use a computer network—multiple computing devices coupled together, and capable of communicating with one another, via a server running network software, such as, for example, Microsoft NT™ or Banyan Vines™. Within computer memory each seller 17 stores instructions 500 enabling them to sell goods and services to buyers using electronic tokens and to detect double-spending of electronic tokens. Instructions 500 may be written in any computer language, including, but not limited to, C++, Python, or Lisp. Each seller may also include within its computer memory instructions 100 to enable it to buy goods and services using electronic token halves.

As used herein, a financial services provider is any entity with which a buyer 16 has an agreement with for the provision of electronic tokens. Pursuant to their agreement, bank 18 may charge the buyer's electronic tokens against the buyer's checking account, savings account, credit card, or debit card. Buyer 16 and bank 18 also agree to use a public-key cryptosystem to communicate with one another and exchange their public keys. This allows buyer 16 to encrypt a message to bank 18 with her private key, which bank 18 can later decrypt using the buyer's private key and vice versa. Sellers 17 also set up accounts with banks, agree to use a public-key cryptosystem and exchange public keys.

Like sellers 17, each bank 18 uses at least one computing device, like computing device 22 or, more likely, uses a computer network to couple to telephone system 20. Instructions 1000 for generating, tracking, and redeeming electronic tokens are stored within the memory of the bank's computing device or computer network. Instructions 1000 may be written in any computer language, including, but not limited to, C++, Python, or Lisp, for example.

B. The Initiating Macrotransaction

The present methods amortize the cost of a connection with bank 18 over several microtransactions by generating in a single connection two sets of electronic token halves that can be spent off-line of bank 18, while still protecting sellers 17 against double-spending. FIGS. 2–6 describe the interaction between buyer 16, seller 17, and bank 18 for generating the two sets of electronic token halves prior to initiating microtransactions between a particular buyer 16 and seller 17.

B.1. Requesting Electronic Tokens

Prior to engaging in any microtransaction, buyer 16 selects a seller 17 whose goods and/or services the buyer would like to purchase, as well as determining the amount of money likely to be adequate for a number of purchases over a period of time. Buyer must determine the seller with whom she wishes to do business because the electronic token halves she will receive from her bank 18 will not be arbitrarily transferable—she will be able to spend her electronic token halves only with that one seller 17.

Figure 2:
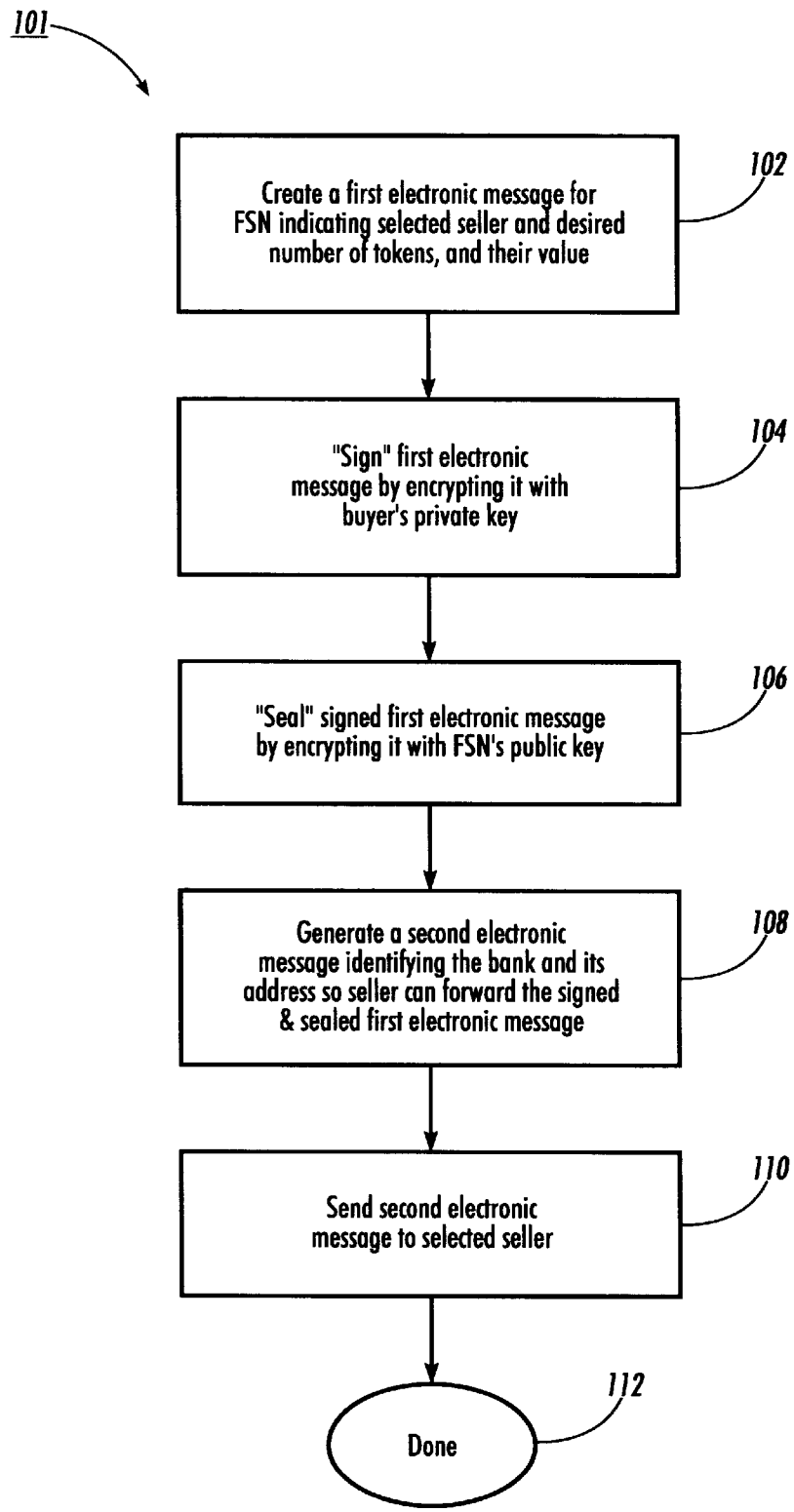
FIG. 2 illustrates a method of requesting electronic tokens for purchases with a selected seller.

Having selected a seller 17, buyer 16 is ready to engage in process 101 illustrated in flow diagram form in FIG. 2, which is a portion of instructions 100. Using smart card 40 inserted, during step 102 buyer 16 generates a first plain text electronic message, intended for her bank, indicating her identity, the seller selected to do business with, the number of electronic tokens desired, and their values. Subsequently, during step 104 buyer 16 uses smart card 40 to electronically sign the first electronic message using the buyer's private key. A number of techniques can be used to digitally sign the plain text message, which affect how the signature is later authenticated by a bank. Buyer 16 could encrypt the entire message using her private key, but this is computationally intensive. A less computationally intense and preferable approach would be to take the plain text message and generate a one-way hash from it using a function agreed upon with bank 18, such as PGP or MD5, for example. Buyer 16 then encrypts just the hash using her private key. Associated with the plain text message, the encrypted hash serves as the buyer's digital signature. In the following discussion, we will assume this is the approach taken by both buyer 16 and bank 18, even though any digital signature technique could be used equally well in the present invention.

Having signed her message, during step 106 buyer 16 seals her message using her smart card 40. Again, buyer 16 may use a number of approaches to seal her message. Buyer 16 could encrypt the entire signed message using the bank's public key and a public key algorithm like RSA, for example, but this is computationally intensive. Alternatively and preferably, buyer could seal her message by generating a session key using a random number generator, encrypt the signed message using the session key and a symmetric algorithm, like IDEA, for example, then encrypt the session key using the bank's public key and append the encrypted session key to encrypted message.

Buyer 16 takes the signed and sealed first electronic message and attaches it, or appends it to, a second electronic message directed to the selected seller 17. Buyer 16 indicates her bank and its address, to which the enclosed, signed, and sealed electronic message should be forwarded. Note that the message need not indicate the buyer's identity to seller 17, providing anonymity to buyer 16, and preventing sellers from building a dossier about buyer 16. When the second electronic message is complete, buyer 16 transmits it to the selected seller 17. Now, buyer 16 awaits receipt of electronic token halves.

Figure 3:
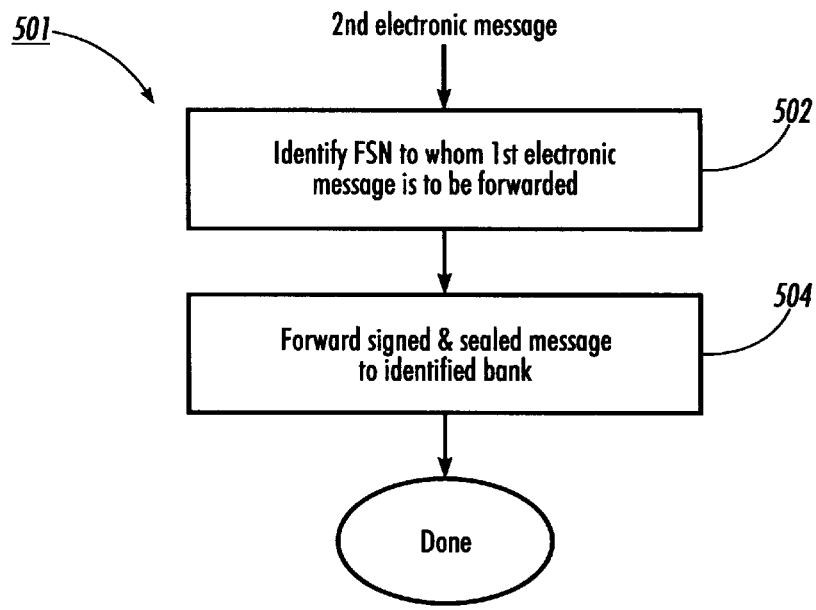
FIG. 3 illustrates a method of forwarding a request for electronic tokens.

FIG. 3 illustrates in flow diagram form the response 501 of seller 17 to receipt of the second electronic message. Instructions 501 are a portion of instructions 500. Using its computer network, during step 502 seller 17 identifies the bank 18 to whom the buyer's first electronic message should be forwarded to. Without any idea of the identity of the buyer, seller 17 then forwards the buyer's first electronic message to the identified bank. During step 504 seller 17 forwards the messages via telephone system 20 using the seller's computer network. Now, like buyer 16, seller 17 awaits receipt of electronic half tokens.

B.2. Generating Electronic Token Halves

FIGS. 4A and 4B illustrate in flow diagram form response 1001 of bank 18 to a request for electronic tokens. Instructions 1001 are a portion of instructions 1000. Bank 18 begins with step 1002 by using its computer network to unseal the signed and sealed message from buyer 16. Bank 18 unseals the message by decrypting the session key using its private key and using the session key to decrypt the message. This reveals the buyer's plain text message and her signed hash. Bank 18 determines from the plain text who the asserted buyer is. Subsequently, during step 1008 bank attempts to determine whether the buyer is who she says she is by authenticating her digital signature. Bank 18 does so by decrypting the signed hash using the buyer's public key and comparing the resulting hash to its own hash of the plain text. If the decrypted hash and that generated by the bank do not match, the buyer is not who she says she is and bank 18 will not generate any electronic tokens. Instead, during step 1012 bank 18 informs the seller 17 and/or the identified buyer that no electronic tokens can be issued. On the other hand, if the two hashes match, bank 18 feels secure that the buyer is who the plain text asserts she is. In response, bank 18 advances to step 1014 to begin the process of generating electronic token halves.

Bank 18 uses its computer network and generates the desired number of electronic tokens in the denominations desired, as indicated by the buyer's plain text request, during step 1014. As discussed previously, each electronic token is a string of electrically represented bits, whose information includes the value of the token and a unique serial number. The serial number assigned to each electronic token should not be unique only to the particular pair of buyer and seller, it should also be unique as to every other electronic token ever issued by the bank 18. Additionally, to prevent anyone from determining the order in which buyer 16 makes her purchases, bank 18 may not wish to assign serial numbers sequentially. The information included in the electronic token also includes the identity of the bank, so that seller 17 will know with which bank the electronic token can be redeemed. Next, bank 18 digitally signs each electronic token using its private key and associates its digital signature with the electronic token. This can be done using the same techniques discussed previously with respect to step 104. This results in a signed string of bits for each electronic token, which we will designate as $S_{BP}(T)$. The length of $S_{BP}(T)$ determines the length of the electronic token halves to be generated subsequently, and so sets the data requirement per microtransaction for the buyer. To support microtransactions effectively, the length of the electronic token and its token halves should be such that they can be represented in about 20–500 bytes. Having generated the electronic tokens, bank 18 is ready to begin the process of splitting them into two sets of electronic token halves.

Many of the advantages of the present invention result from splitting the electronic tokens in half using secret splitting. Secret splitting splits a secret, in this case the value of electronic token, into multiple pieces. None of the parties to the secret can learn the secret without all cooperating with one another to combine their secret pieces. Each secret piece is valueless on its own, as well as meaningless to anyone without all the other secret pieces. Because each electronic token half is valueless by itself, buyer 16 is protected from unauthorized redemptions of electronic tokens by seller 17. When session serial numbers are added to the electronic token halves, both bank 18 and buyer 17 are protected from double spending.

Referring again to FIGS. 4A and 4B, for simplicity steps 1018–1024 show only one electronic token being split in half at a time; however, the present invention is consistent with many electronic tokens being split at once. First, during step 1020, bank 18 selects one of the signed electronic tokens to be split using secret splitting. Other methods of splitting the electronic tokens may be used consistent with the present invention. During step 1020, using its computer network bank 18 generates a first token half for the buyer. This is done by generating a random electronic string P whose bit length is equal to that of the selected signed token. The random string P is then used to create the second token half for the signed electronic token. Using its computer network, bank 18 generates the second electronic token half, Q, by performing a bitwise XOR of $S_{BP}(T)$ and P, resulting in Q. Neither the first electronic token half, P, nor the second electronic token half, Q, have any value of themselves; however, they can be combined together by a bitwise XOR to obtain $S_{BP}(T)$. This prevents seller 17 from redeeming tokens without the consent of buyer 16, as well as protecting seller 17 from double-spending by buyer 16. Note also, that buyer 16 can use her electronic tokens only for purchases with the selected seller. If she wishes to do business with another seller, she must obtain another, different set of token halves.

Having split the signed electronic token, during step 1024 bank 18 assigns and associates a session serial number with both token halves P and Q to identify the token halves that should be combined together. Each session serial number needs to be unique as to the entire set of electronic tokens being generated during this macrotransaction, but need not be unique as to all macrotransactions between this seller and buyer because before a new macrotransaction can be initiated the electronic token halves from the previous microtransaction are flushed. That done, bank 18 returns to step 1016 and branches through step 1018–1024 until all of the signed electronic tokens have been split in half. When all of the signed electronic tokens have been split in half, bank 18 advances to step 1025.

During step 1025, in anticipation of the future redemption of the electronic tokens just generated bank 18 makes an entry to a database in its computer memory. Bank 18 uses this database to track valid, unredeemed electronic tokens. Bank 18 makes an entry in this database for every buyer-seller pair with outstanding, valid electronic tokens. Bank 18 assigns a unique identifier, which we shall call a purse identifier, to the group of electronic tokens just generated. Banks 18 then notes the purse identifier in its database entry for this buyer-seller pair, as well as all of the session serial numbers of those electronic tokens. Bank 18 also stores the address of seller 17 in the database entry in case buyer 16 should wish to redeem unspent electronic token halves. That done, bank 18 advances to step 1026 from step 1025.

With step 1026 bank 18 is now ready to begin separating the electronic token halves into a seller's purse and a buyer's purse. Bank 18 may assign to the seller all of the first token halves, P, all of the second token halves, Q, or some combination of the first and second electronic token halves, without effecting the present method, so long as neither the seller, nor the buyer, receives both halves of an electronic token. To the seller's purse, bank 18 adds the purse identifier generated during step 1026, which the seller uses during communications with respect to electronic tokens from this purse. Bank 18 then signs and seals the seller's purse. Bank 18 then assigns the remaining token halves to the buyer's purse during step 1028, adds the purse identifier, and seals these token halves with the buyer's public key. Finally, during step 1030, bank sends both electronic purses to the selected seller 17 via telephone network 20, with an indication of which electronic purse belongs to whom. (Note that bank 18 need not send the buyer's electronic token halves care of seller 17 if buyer 18 is on-line, rather than just using her smart card 40.) Bank 18 need not be involved in the business between buyer 16 and seller 18, until one of the parties wishes to redeem the electronic tokens.

B.3. Receiving Electronic Purses

Figure 5:
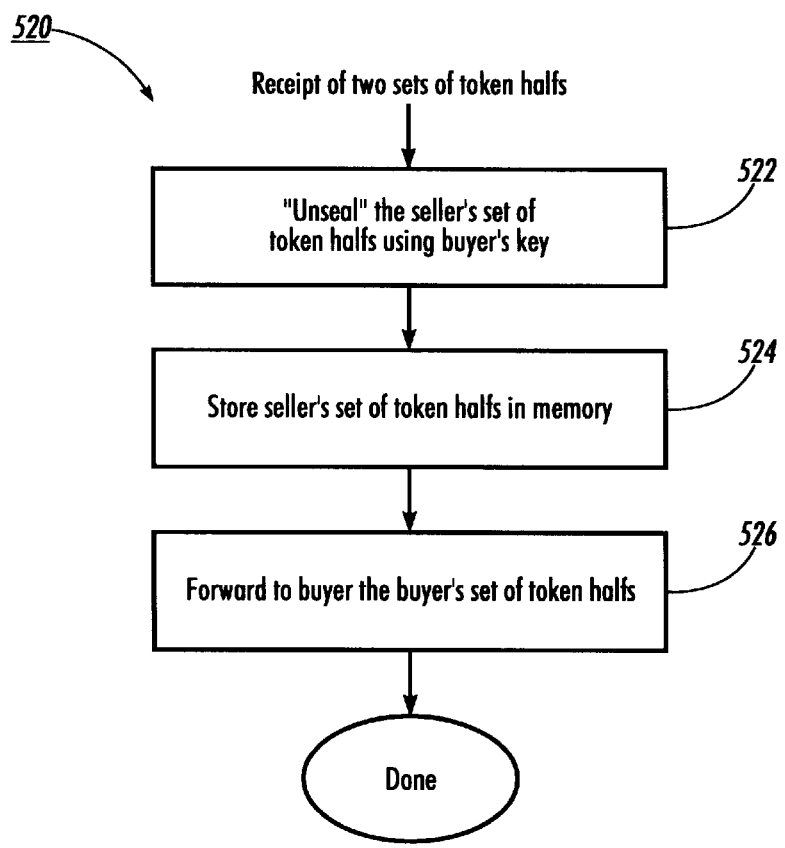
FIG. 5 illustrates a seller's response to receipt of two electronic purses, each including a set of electronic token halves.

FIG. 5 illustrates in flow diagram form the response 520 of seller 17 to receipt of the two electronic purses. Response 520 is a portion of instructions 500. After determining which electronic purse is his, during step 522 seller 17 unseals his electronic purse using his computer network and his private key. Seller 17 stores the electronic token halves and purse identifier so revealed in computer memory in a location associated with buyer 16 during step 524. Afterward, seller 17 forwards to buyer 16 her electronic purse via telephone system 20. Seller 17 is now prepared to transact business with buyer 16 off-line of bank 18.

Modifications to response 520 to accommodate receipt by seller 17 of only his electronic purse will be obvious to those of ordinary skill in the art.

Figure 6:
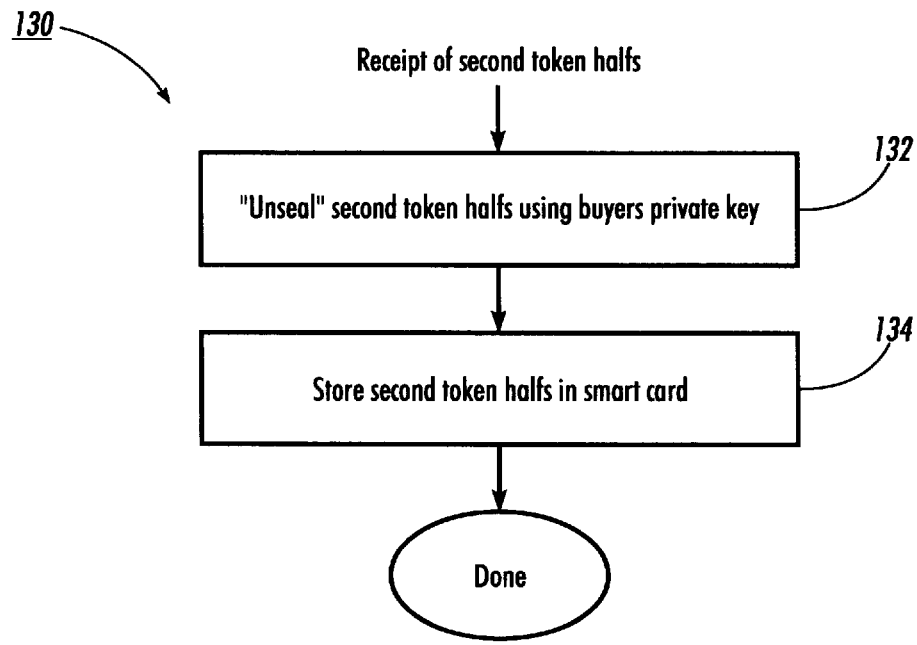
FIG. 6 illustrates a buyer's response to receipt of an electronic purse.

As illustrated in FIG. 6, in flow diagram form, the response 130 of buyer 16 to receipt of her electronic purse is nearly identical to that of seller 17. Response 130 is a portion of instructions 100, and is executed by buyer 16 using her smart card 40. The primary difference between the response of buyer 16 and seller 17, is that buyer 16 stores her electronic token halves and purse identifier in smart card 40, which is portable and can be used independent of computing device 22. Thus, buyer 16 can purchase goods and/or services from seller 17 at one of the seller's places of business or remotely using computing device 22 and telephone system 20. Buyer 16 can now initiate microtransactions with seller 17 off-line of bank 18.

C. Off-line Microtransactions

Figure 7:
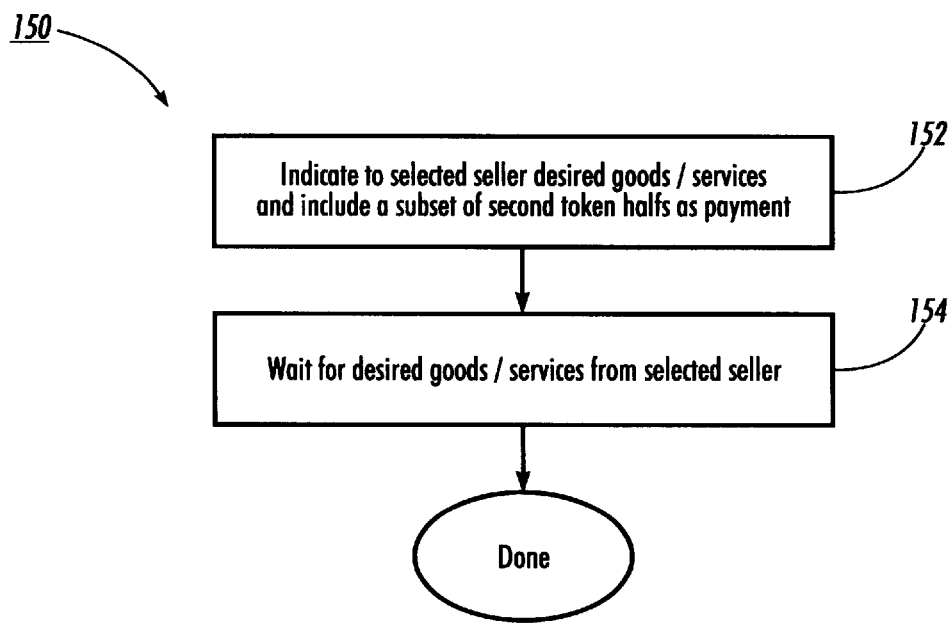
FIG. 7 illustrates initiation of a microtransaction off-line from a financial services provider.
Figure 8:
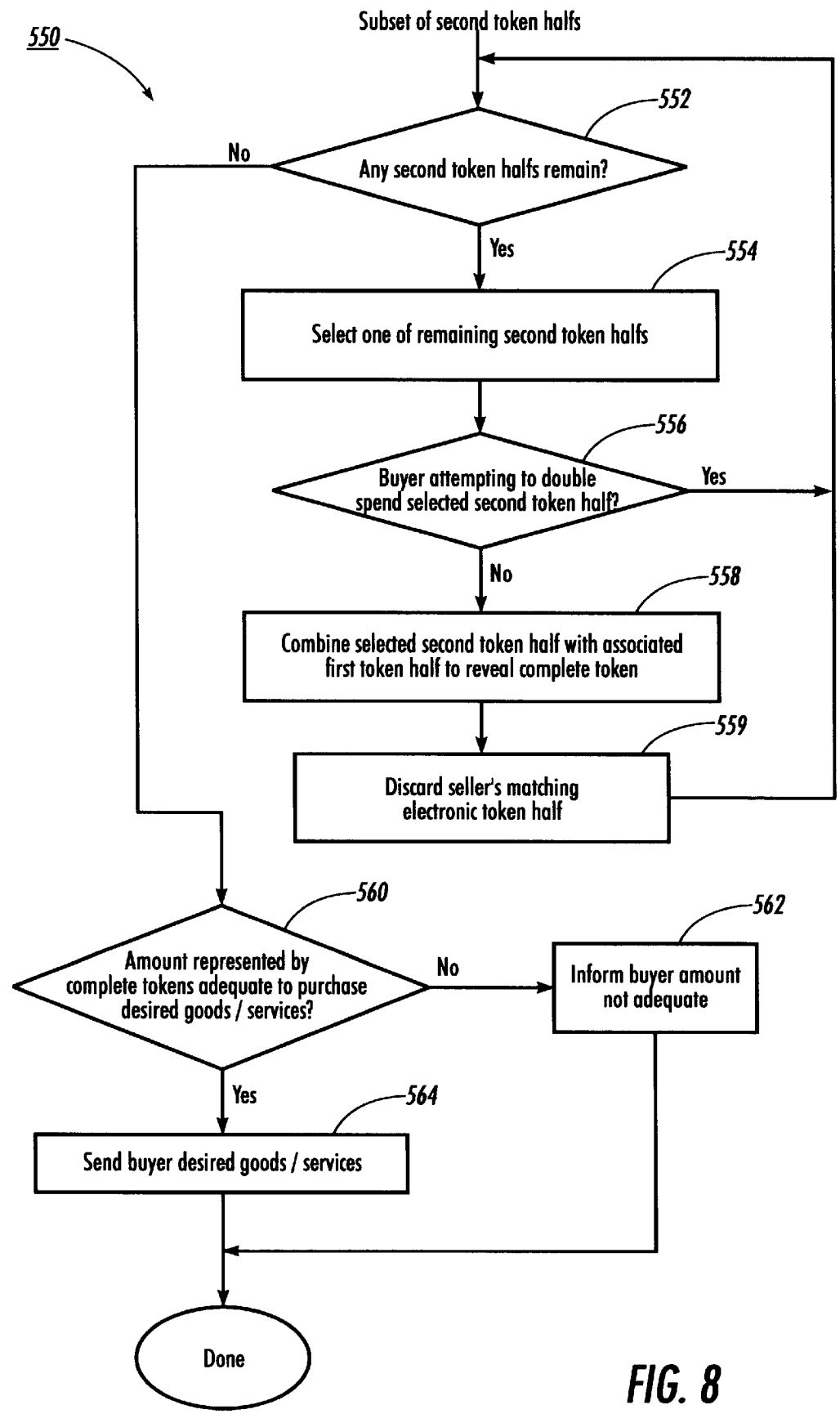
FIG. 8 illustrates completion of a microtransaction off-line from a financial services provider.

FIGS. 7 and 8 illustrate the process of a single microtransaction; however, once a buyer-seller pair have a corresponding pair of electronic token halves they are free to engage in as many microtransactions as the value of their electronic token halves permit without the involvement of bank 18. This amortizes over many microtransactions the computational cost to buyer 16 of signing and sealing her token request, as well and unsealing her token halves. Also amortized over several microtransactions is the seller's computational cost of unsealing his electronic token halves. In addition to amortizing the connection time required for a macrotransaction over several microtransactions, the methods FIGS. of 7 and 8 keep the computational cost per microtransaction quite low. The computational cost of each microtransaction is quite low for the buyer because there in no encryption or decryption, signing or sealing per microtransaction. All buyer 16 need do is transmit each electronic token half, each of which is represented by about 20–500 bytes per electronic token half. The computational cost per microtransaction is also quite low for seller 17, one private/public decryption per microtransaction (checking the bank's signature each time a token is combined). This is important given the small value of each individual microtransaction to prevent the seller's overhead costs from exceeding the amount collected for each microtransaction.

FIG. 7 illustrates in flow diagram form a portion 150 of instructions 100 for initiating a microtransaction off-line of a bank. After making her selection and noting its price, buyer 16 indicates to seller 17 her choice and enables the transmission of the appropriate number of electronic token halves from her smart card 40 to the seller's computer network. Note that buyer 16 still remains anonymous. Having done that, buyer 16 need only await delivery of the purchased good/and or services.

FIG. 8 illustrates in flow diagram form the response 550 of a seller 17 to receipt of a request for goods and/or services that includes electronic token halves. Response 550 is a portion of instructions 500.

Seller 17 has two concerns at this point: 1) Is the buyer attempting to cheat him? and 2) Has the buyer offered enough money? Using its computer network, seller 17 addresses these concerns one electronic token half at a time. After selecting one of the buyer's electronic token halves, seller 17 examines the session serial number associated with the selected token half during step 556 to determine whether it matches that of one of the seller's remaining token halves. If not, then buyer 16 is attempting to double spend an electronic token half. In response, seller 17 returns to step 552 from step 556 to continue its examination of the buyer's electronic token halves. On the other hand, if seller 17 always disposes of all copies of an electronic token half after successfully combining that token half with one of the buyer's, then seller 17 can rest assured that buyer 18 is not attempting to double spend an electronic token half when two electronic token halves have a matching session serial number. In response to identifying one of his own token halves that has a session number matching the selected buyer's token half, seller 17 advances to step 558 from step 556.

Seller 17 combines the two electronic token halves with matching serial session numbers during step 558 by performing a bitwise XOR. This produces the corresponding signed electronic token, $S_{BP}(T)$, revealing the plain text of the electronic token and the associated bank signature. To authenticate the electronic token, seller 17 decrypts the hash using bank's public key and compares the resulting hash to that of the plain text for the electronic token. If the two hashes match, seller 17 considers the electronic token valid. Seller 17 may not choose to authenticate every electronic token, choosing instead to authenticate some random subset of all electronic tokens. This reduces the seller's computational burden per microtransaction. Seller 17 responds to a valid electronic token by noting its value and storing it in memory for future redemption and advances to step 559.

During step 559 seller 17 removes from memory any copies of electronic token halves with a serial session number matching that just used to enable detection of future double spending attempts. Seller 17 now turns its attention to any remaining electronic token halves received from buyer 16. So long as any remain, seller 17 branches through steps 552 through 559 in the manner just described. After processing all of the electronic token halves transmitted by buyer 16, seller 17 exits step 552 and advances to step 560.

During step 560 seller 17 examines the sum of all of the electronic tokens resulting from the process of steps 552 through 559 to see if that sum is enough to pay for the goods and/or services requested by buyer 16. If not, seller 17 so informs buyer 16 during step 562. On the other hand, if the sum is adequate, seller 17 releases the desired goods and/or services to buyer 16. Seller 17 may release them directly to buyer 16 if she is present, or in the case of many World Wide Web businesses may transmit them electronically to buyer 16 via telephone system 20, allowing buyer 16 to maintain her anonymity.

D. The Concluding Macrotransaction

D.1. Response to a Redemption Request by a Seller

After a number of off-line microtransactions, seller 17 may wish to redeem his electronic tokens with the issuing bank 18. Seller 17 can do so generating a plain text electronic message identifying himself and requesting redemption of the electronic tokens from the identified purse, and signing the request. Seller 17 then seals the signed redemption request using the bank's public key and sends the request via telephone network 20 to the bank's computer network.

Figure 9:
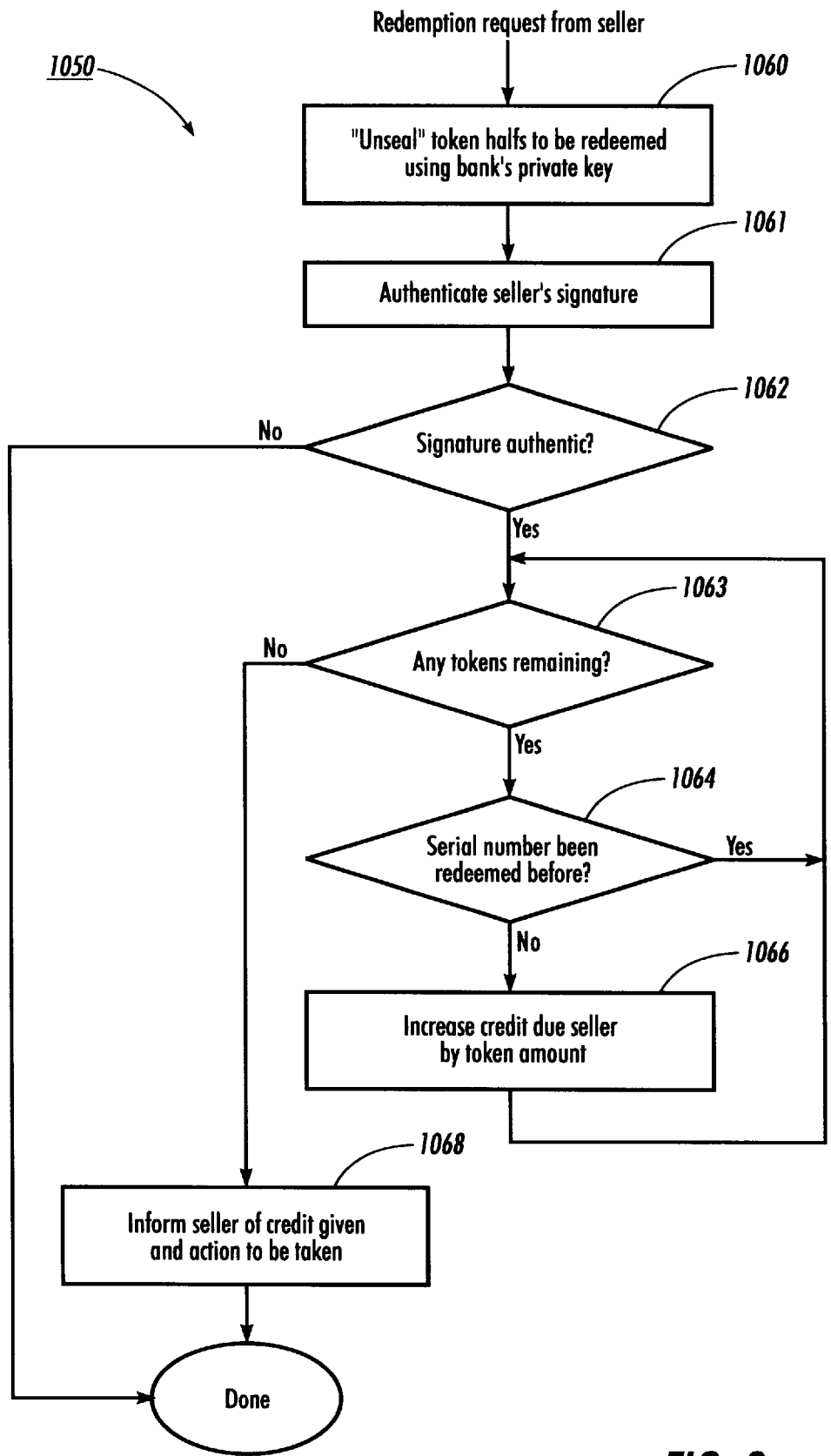
FIG. 9 illustrates a method of redeeming electronic tokens.

FIG. 9 illustrates in flow diagram the response 1060 of bank 18 to a redemption request from seller 17. Response 1060 is a portion of instructions 1000. Bank 18 responds to receipt of a sealed electronic message in step 1060 by unsealing the message using its private key and revealing the plain text redemption request, the purse identifier, the electronic tokens that the seller wishes to redeem and the seller's signature.

At this point, bank 18 has two concerns: 1. Is the seller who he purports to be? and 2. Is the seller attempting to double spend? Bank 18 addresses the former concern by authenticating the seller's signature during step 1061. If the signature is not authentic, bank 18 will not redeem any of the tokens. On the other hand, if the signature is authentic, bank 18 turns its attention to the latter concern, double spending, which it addresses one electronic token at a time.

To detect double spending of an electronic token, during step 1064 bank 18 compares the token's session serial number to session serial numbers remaining in the database entry for the purse identifier. If bank 18 does not find a match, the seller is attempting to double spend the token, and bank 18 will not credit the seller for that electronic token. On the other hand, if the serial number of the electronic token matches a session serial number remaining in the relevant database entry, bank 18 removes the session serial number of the redeemed electronic token from the database entry and advances to step 1066. Bank 18 may also detect double spending using other approaches. Whatever approach is taken, bank 18 needs to ensure that it only honors an electronic token once.

Once bank 18 determines that an electronic token is valid, however that is done, during step 1066 bank 18 increases the sum due to seller 17 by the amount of the electronic token. That done, bank 18 continues executing steps 1063 through 1066 until all of the seller's electronic tokens have been processed. When that occurs, during step 1068 bank 18 informs seller 17 of the credit to be given him and how that credit will be given to him.

D.2. Response to a Redemption Request by a Buyer

Buyer 16 generates a redemption request for her unspent electronic token halves in much the same manner as discussed previously with respect to seller 17, including instead her unspent electronic token halves and the purse identifier. Nonetheless, the response of bank 18 to a redemption request from buyer 16 differs from that of a request from seller 17. Bank 18 responds differently because of its concern with protecting seller 17 from double spending by buyer 16, as well as protecting itself from double spending by both parties. Briefly described, bank 18 protects seller 17 from any attempts by buyer 16 to redeem electronic tokens buyer 16 has already paid to seller 17 by requesting that seller 17 redeem all of its electronic token halves, spent and unspent. Bank 18 then processes the seller's electronic tokens prior to redeeming the buyer's unspent electronic token halves.

Figure 10A:
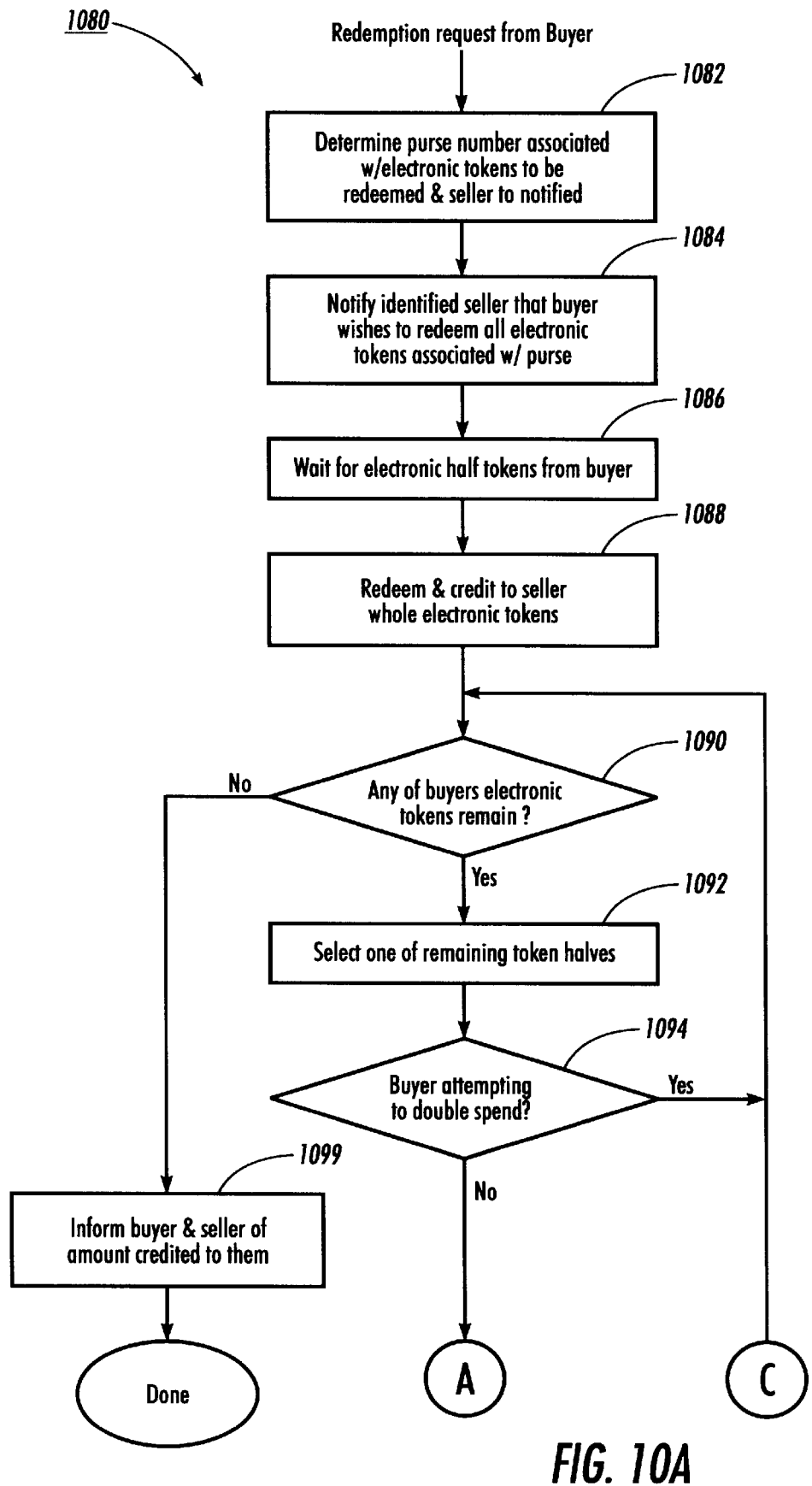
FIGS. 10A and 10B illustrate a method of redeeming unspent electronic token halves.
Figure 10B:
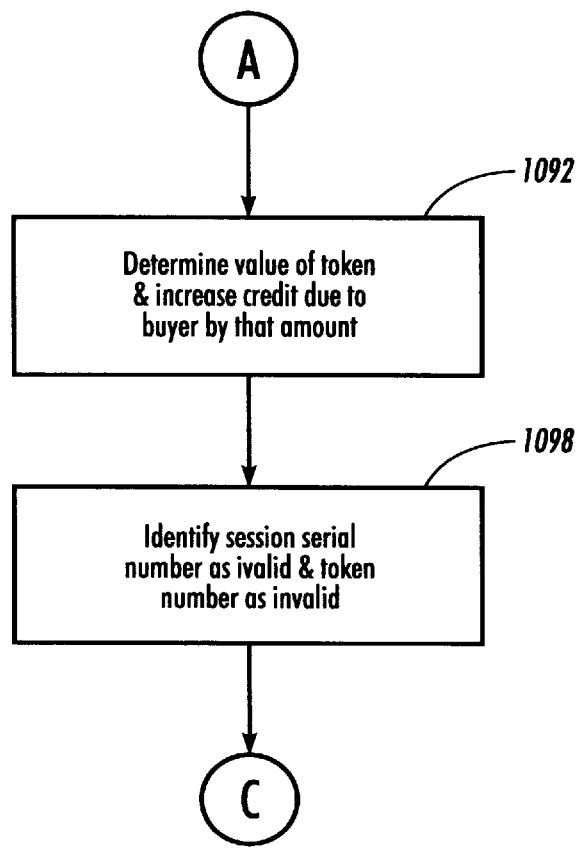

FIG. 10 illustrates in detail the response 1080 of bank 18 to a redemption request from buyer 16. Response 1080, illustrated in flow diagram form, is a portion of instructions 1000. For brevity's sake, the steps of unsealing and signature authentication have not been illustrated. After determining that buyer 16 is who she says she is, bank 18 notes the purse identifier for the unspent electronic token halves. Bank 18 uses the purse identifier to retrieve the address of seller 17 from the relevant database entry. Subsequently, during step 1084, bank 18 informs seller 17 of the buyer's redemption request and asks seller 17 to return all spent electronic tokens and all unspent electronic token halves associated with the purse identifier. That done, bank 18 awaits receipt of the seller's purse during step 1086.

Upon receipt of the seller's purse, bank 18 redeems the valid electronic tokens during step 1088 using the process described previously with respect to FIG. 9. This enables bank 18 to detect whether buyer 16 is attempting to cheat seller 17 by trying to redeem with bank 18 electronic token halves that buyer 16 has already paid to seller 17. In the process, bank 18 identifies the valid session serial numbers by removing from the relevant database entry the session serial number of each redeemed electronic. Bank 18 then advances to step 1090 from step 1088.

Bank 18 turns its attention to redeeming the buyer's previously unspent electronic token halves with step 1090, which bank 18 does one electronic token half at a time. Bank 18 selects one of the buyer's returned electronic token halves during step 1092 and then compares the session serial number of the selected token half to those session serial numbers remaining in the relevant database entry. If the session serial number is not in the database entry, bank 18 will not credit buyer 16 for that electronic token. On the other hand, if a matching session serial number is found in the database during step 1094, bank 18 regards the electronic token half as valid. In response, bank 18 advances to step 1096.

Bank 18 determines the value of the electronic token being redeemed during step 1096 by combining the selected buyer's token half with the seller's corresponding token half; i.e., the seller's token half with the corresponding session serial number. Bank 18 does so by performing a bitwise XOR of P and Q to produce $S_{BP}(T)$. Bank 18 then increases the sum due to buyer 16 by the face amount of the electronic token. Bank 18 then removes from the relevant database entry the serial session number of the electronic token just redeemed. Bank 18 also marks as invalid the serial number included in the electronic token. Afterward, bank 18 returns to step 1090.

Bank 18 continues executing steps 1090 through step 1098 by until all of the buyer's electronic token halves have processed. When that occurs, bank 18 branches to step 1099 from step 1090. Bank 18 then inform both buyer 16 and seller 17 the credit due to them.

E. Authorizations

Sellers 17 may desire authorizations from buyers 16 prior to completing certain microtransactions. For example, a secure library service may want to know that the buyer has the necessary security clearance or a provider of adult materials will want to know that the purchaser of the material is over 21 years of age. The methods previously discussed can be modified to provide authorizations while still maintaining the anonymity of the buyer. Depending on the level of service provided by a bank 18, buyer 16 may be able to obtain authorization token halves from bank 18 or may have to obtain these from a special authorization service. Whatever service provides authorizations, buyer 16 will have to prove that she possesses the characteristics she wishes to assert about herself; that she has a certain security clearance, or that she is 21 years old. Having proved she possesses the necessary characteristic, buyer can request authorization tokens from the authorization in substantially the same manner discussed previously with respect to FIG. 2. Upon receipt of the authorization request, the authorization service can generate authorization tokens and split them in half using the same method discussed previously with respect to FIGS. 4A and 4B. Authorization token halves have no authority by themselves—prove nothing in the absence of another authorization token half with a matching session serial number. Upon receipt of her authorization token halves, buyer 16 can use them to authorize purchases while maintaining her anonymity using the same methods discussed previously with respect to FIG. 7. The response 550 of a seller to a purchase request requiring authorization is substantially that discussed previously with respect to FIG. 8.

F. Conclusion

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. A method of generating electronic monetary tokens that supports payments between a buyer and a seller off-line of a financial services provider while preventing double spending, the method comprising:

a) generating a first multiplicity of electronic monetary tokens in response to a request from the buyer for use with the seller;

b) splitting each electronic monetary token into two electronic token halves having a same serial number, each pair of electronic tokens halves having the same serial number recreating the electronic monetary token when combined together, each electronic token half having no monetary value;

c) delivering a subset of the electronic token halves to the seller; and d) delivering another subset of the electronic token halves to the buyer.

2. The method of claim 1 further comprising:

e) storing in a database entry the session serial numbers of the electronic monetary tokens.

3. The method of claim 2 further comprising:

f) in response to a redemption request including a first electronic monetary token, detecting an attempt to double spend the first electronic monetary token using a session serial number of the first electronic monetary token and the database entry.

4. The method of claim 2 further comprising:

f) in response to a redemption request from the buyer including a first electronic token half having a first session serial number:

1) redeeming electronic monetary tokens received from the seller;

2) noting as invalid the sessions serial numbers of the electronic monetary tokens received from the seller using the database entry; and 3) detecting an attempt to double spend the first electronic token half using the database entry.

5. The method of claim 1 further comprising:

e) generating a second multiplicity of electronic authorization tokens in response to a request from the buyer for use with the seller and proof of an assertion about the buyer;

f) splitting each electronic authorization token into two authorization token halves having a same serial number, each pair of authorization token halves having the same serial number recreating the electronic authorization token when combined together, each authorization token half having no authority without an authorization token half having the same serial number;

g) delivering a subset of the authorization token halves to the seller; and h) delivering another subset of the authorization token halves to the buyer.

6. The method of claim 5 further comprising:

i) storing in a database entry the session serial numbers of the electronic monetary tokens.

7. The method of claim 6 further comprising:

f) in response to a redemption request including a first electronic monetary token, detecting an attempt to double spend the first electronic monetary token using a session serial number of the first electronic monetary token and the database entry.

8. The method of claim 6 further comprising:

f) in response to a redemption request including a first electronic token half having a first session serial number:

1) redeeming electronic monetary tokens received from the seller;

2) noting as invalid the sessions serial numbers of the electronic monetary tokens received from the seller using the database entry; and 3) detecting an attempt to double spend the first electronic token half using the database entry.

9. A method of supporting electronic payments between a buyer and a seller off-line of a financial services provider that prevents double-spending, the method comprising the steps of:

a) generating a first number of electronic monetary tokens in response to a request from the buyer for use with the seller, the first number being greater than two, each electronic token having a second number of bits representing a monetary value of the electronic monetary token;

c) splitting each of the first number of electronic monetary tokens into two electronic token halves by:

c1) for each electronic token creating a first token half by generating a random string having a third number of bits equal to the second number of bits;

c2) for each electronic monetary token creating a second token half by performing a bitwise XOR using the electronic monetary token and the first token half;

c3) for electronic monetary token associating with each token half a serial number, each electronic token half having no monetary value alone and combining with another electronic token half having a same serial number to recreate an electronic monetary token;

d) electronically transmitting to the seller a first subset of the electronic token halves, none of the first subset of electronic token halves having a same serial number; and e) electronically transmitting to the buyer a second subset of the electronic token halves, none of the second subset of electronic token halves having a same serial number.

10. The method of claim 9 further comprising the step of:

f) delivering a good to the buyer in response to receipt of a one of the electronic token halves of the second subset if off-line of the financial services provider the one of the electronic token halves from the second subset combines with a one of the electronic token halves from the first subset to recreate an electronic monetary token.

11. The method claim 9 further comprising the step of:
   f) storing in a database entry the serial numbers of each pair of electronic token halves generated during step c).

12. The method of claim 11 further comprising the steps of:
   g) in response to a redemption request from the seller including a first electronic monetary token, detecting an attempt to double spend the first electronic monetary token using a session serial number of the first electronic token and the database entry.

13. The method of claim 11 further comprising the steps of:
   g) in response to a redemption request from the buyer including a first electronic token half having a first session serial number:
      1) redeeming electronic monetary tokens received from the seller;
      2) noting as invalid the sessions serial numbers of the electronic monetary tokens received from the seller using the database entry; and
      3) detecting an attempt by the buyer to double spend the first electronic token half using the database entry.

14. The method of claim 9 further comprising the steps of:
   f) generating a third number of electronic authorization tokens in response to a request from the buyer for use with the seller and proof of an assertion about the buyer, each electronic authorization token having a fourth number of bits representing the assertion about the buyer;
   g) splitting each of the third number of electronic authorization tokens into two authorization token halves by:
      g1) for each electronic authorization token creating a first authorization token half by generating a random string having a fifth number of bits equal to the fourth number of bits;
      g2) for each electronic authorization token creating a second authorization token half by performing a bitwise XOR using the electronic authorization token and the first authorization token half;
      g3) for each electronic authorization token associating with each authorization token half a serial number, each authorization token half having no authority alone and combining with another authorization token half having a same serial number to recreate an electronic authorization token;
   d) electronically transmitting to the seller a first subset of the authorization token halves, none of the first subset of authorization token halves having a same serial number; and
   e) electronically transmitting to the buyer a second subset of the authorization token halves, none of the second subset of authorization token halves having a same serial number.

15. A method of generating electronic tokens that supports off-line transactions between a first party and a second party, the method comprising:
   a) generating a first multiplicity of electronic tokens in response to a request from the first party for use with the second party;
   b) splitting each electronic token into two electronic token halves having a same serial number, each pair of electronic tokens halves having the same serial number recreating the electronic token when combined together, each electronic token half being unintelligible without an electronic token half having the same serial number;
   c) assigning a subset of the electronic token halves to the second party; and
   d) assigning another subset of the electronic token halves to the first party.

16. The method of claim 15 further comprising:
   e) storing in a database entry the serial numbers of the electronic tokens.

17. The method of claim 16 further comprising:
   f) in response to a redemption request including a first electronic token, detecting an attempt to double spend the first electronic token using a serial number of the first electronic token and the database entry.

18. The method of claim 16 further comprising:
   f) in response to a redemption request including a first electronic token half having a first serial number:
      1) noting as invalid the serial numbers of the electronic tokens received from the second party using the database entry; and
      2) detecting an attempt to double spend the first electronic token half using the first serial number and the database entry.

19. The method of claim 15 wherein splitting each electronic token comprises:
   1) for each electronic token creating a first token half by generating a random string having a number of bits equal to a number of bits of the electronic token;
   2) for each electronic token creating a second token half by performing a bitwise XOR using the electronic token and the first token half.

20. An article of manufacture comprising:
   a) a memory; and
   b) instructions stored in the memory for a method of supporting off-line electronic transactions between a buyer and a seller that prevents double-spending, the method comprising:
      1) generating a first number of electronic tokens in response to a request from the buyer for use with the seller, the first number being greater than two, each electronic token having a second number of bits;
      2) splitting each of the first number of electronic monetary tokens into two electronic token halves by:
         A) for each electronic token creating a first token half by generating a random string having a third number of bits equal to the second number of bits;
         B) for each electronic token creating a second token half by performing a bitwise XOR using the electronic token and the first token half;
         C) for electronic token associating with each token half a serial number, each electronic token half being unintelligible alone and combining with another electronic token half having a same serial number to recreate an electronic token;
      3) assigning to the seller a first subset of the electronic token halves, none of the first subset of electronic token halves having a same serial number; and
      4) assigning to the buyer a second subset of the electronic token halves, none of the second subset of electronic token halves having a same serial number.

21. The article of manufacture of claim 20 wherein the instructions stored in the memory further comprise:
   5) storing in a database entry the session serial numbers of the electronic monetary tokens.

22. The article of manufacture of claim 21 wherein the instructions stored in the memory further comprise:
   6) in response to a redemption request from the seller including a first electronic monetary token, detecting an attempt to double spend the first electronic monetary token using a session serial number of the first electronic token and the database entry.

23. The article of manufacture of claim 21 wherein the instructions stored in the memory further comprise:

6) in response to a redemption request from the buyer including a first electronic token half having a first session serial number:
  A) redeeming electronic monetary tokens received from the seller;
  B) noting as invalid the sessions serial numbers of the electronic monetary tokens received from the seller using the database entry; and
  C) detecting an attempt by the buyer to double spend the first electronic token half using the first session serial number and the database entry.

24. The article of manufacture of claim 20 wherein the instructions stored in the memory further comprise:

5) generating a second multiplicity of electronic authorization tokens in response to a request from the buyer for use with the seller and proof of an assertion about the buyer;

6) splitting each electronic authorization token into two authorization token halves having a same serial number, each pair of authorization token halves having the same serial number recreating the electronic authorization token when combined together, each authorization token half having no authority without an authorization token half having the same serial number;

7) delivering a subset of the authorization token halves to the seller; and 8) delivering another subset of the authorization token halves to the buyer.

* * * * *